United States Patent [19]

Komura

[11] Patent Number: 5,402,583
[45] Date of Patent: Apr. 4, 1995

[54] TAPE MEASURE

[75] Inventor: Manabu Komura, Kyoto, Japan

[73] Assignee: Kyoto Measuring Instruments Corp., Kyoto, Japan

[21] Appl. No.: 87,036

[22] Filed: Jul. 1, 1993

[30] Foreign Application Priority Data

Jan. 13, 1993 [JP] Japan .................. 5-003372 U

[51] Int. Cl.⁶ .................................................. G01B 3/10
[52] U.S. Cl. ........................................................ 33/758
[58] Field of Search ............... 33/757, 758, 668, 759; 156/667

[56] References Cited

U.S. PATENT DOCUMENTS

| | | | |
|---|---|---|---|
| 1,303,756 | 5/1919 | Ballon | 33/758 |
| 1,542,990 | 6/1925 | Tonasso | 33/758 |
| 1,798,476 | 3/1931 | Langsner | 33/758 |
| 2,619,438 | 11/1952 | Varian et al. | 156/664 |
| 2,686,366 | 8/1954 | Berkovic | 33/758 |
| 4,587,199 | 5/1986 | Bennett | 430/260 |
| 4,930,227 | 6/1990 | Ketchpel | 33/757 |
| 5,246,530 | 9/1993 | Bugle et al. | 156/667 X |

*Primary Examiner*—William A. Cuchlinski, Jr.
*Assistant Examiner*—G. Bradley Bennett
*Attorney, Agent, or Firm*—Jordan and Hamburg

[57] ABSTRACT

A tape measure having an end hook capable of easily holding an object to be measured is proposed. A measuring strip is a self-sustaining metal strip formed with a convex section which has scale marks put thereon and painted. The end hook is a metal plate bent at a right angle and secured with rivets to the end of the measuring strip. A friction plate is a metal plate having an unevenly etched surface which is attached to the inside surface of the end hook by the use of an adhesive, double-coated tape. The uneven surface of the end hook is effective for holding the object to be measured.

9 Claims, 3 Drawing Sheets

TAPE MEASURE

BACKGROUND OF THE INVENTION

The present invention relates to a tape measure whose measuring strip (blade) is provided at its free end with an end hook that has a projecting front end bent at a right angle to the measuring strip and a coarse surface for abutting the object to be measured.

Usually, the end hook of a tape measure is an L-shaped square hook whose fixed portion is secured to the free end of the measuring strip in such a way as to be movable in a longitudinal direction and whose projecting front end is bent at a right angle thereto. When the tape measure is being used, the end hook is abutted at its front (outside) or rear (inside) surface against a flat surface or edge of the object to be measured.

For example, in the case of measuring the inside width of a window opening it is necessary to abut the front surface of the end hook of the tape measure against the inner wall of the window's opening.

On the other hand, in the case for determining the width or length of a table plate, the end hook of the tape measure is hooked at its rear surface on the edge of the table plate and the measuring strip is drawn from a case along the table top. In this case the hook might slip off the table's edge even if the measuring strip is of a self-sustaining type made of a flexible but stiff material such as steel. In this case, it may be necessary to replace the hook at the table's edge often.

To avoid this, one must hold the end hook of the tape measure by one hand and draw the measuring tape with the other hand when measuring the length of an object that is shorter than an open arm's width. However, if the object's length exceeds the width of an open arm, help is required from another person or the hook must be fixed to the object by the use of a subsidiary means such as a needle, adhesive tape, a magnet and so on.

Conventionally, a variety of fixing means have been devised, for example, to form linear grooves on the abutting surface of the end hook of a tape measure, or to provide a small convexed portion on the under surface of the end hook, or to apply a frictional layer of fine crystal material on the abutting surface of the end hook as disclosed in the Japanese publication of unexamined patent application No. 3-295401.

The above-mentioned proposals, however, have the following drawbacks: the existence of a partial convexity scarcely improves the holding effect and the application of a fine crystal frictional layer to the hook's surface often causes an uneven thickness, thereby decreasing the accuracy of the measuring process and increasing the manufacturing costs.

SUMMARY OF THE INVENTION

It is therefore the primary object of the present invention to provide a tape measure which has an end hook of high accuracy in size and capable of holding easily any object to be measured.

Another object of the present invention is to provide a tape measure which is provided the free end of its measuring strip with an end hook having an unevenly etched surface for abutting onto the object to be measured.

A further object of the present invention is to provide a tape measure wherein an end hook, secured to the free end of the measuring strip, is provided at its surface with a member having an unevenly etched surface for abutting onto the object to be measured.

An even further object of the present invention is to provide an end hook for a tape measure which has an unevenly etched surface capable of easily securing the object to be measured and which can be manufactured with sufficient accuracy because of the unevenness of its surface composed of micro-area concavities and convexities formed by etching without changing the total thickness of the whole hook's plate.

DESCRIPTION OF THE PREFERRED EMBODIMENTS

Figure 1:
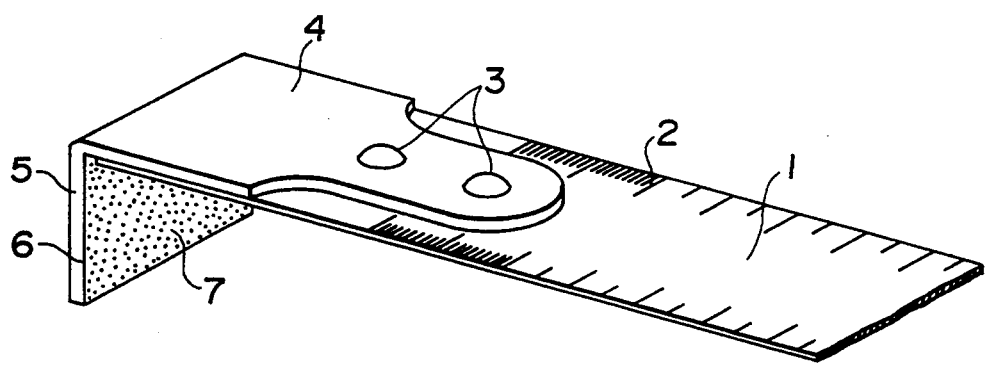
FIG. 1 is a perspective view for explaining an example of the end hook of a conventional tape measure.

FIG. 1 is a perspective view of an end-hook portion of the prior art tape measure disclosed in the Japanese publication of the unexamined patent application No. 3-295401.

In FIG. 1, numeral 1 designates a measuring strip which has scale marks 2 put on both edges of its upper surface and is provided at its free end with an end hook 4 secured thereon with rivets 3. The end hook 4 has an abutting portion 5 projecting from the measuring strip 1 and bent at a right angle thereto. The measuring strip 1 may abut at the front or rear surface of the abutting portion 5 of the end hook 4 against the object to be measured. For example, in the case of measuring a plate's size, the measuring strip 1 may hold the plate's edge by the rear surface 6 of the end hook 4. The measuring strip 1 is made of a flexible but stiff material usually made of steel and may also be made of a synthetic or compound material.

To firmly hold the end hook 4 on the usually round and smooth edge of the object to be measured, the rear surface 6 of its abutting portion 5, for abutting onto the object 11 (FIG. 2) to be measured has a rough coating 7 of fine particles. The coating 7 is made of a mineral or artificial material and is secured to the rear surface 6 with an adhesive or by sintering.

Figure 2:
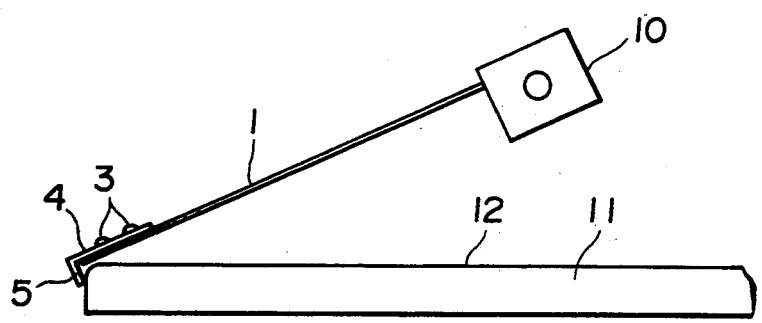
FIG. 2 is a view showing an example of an application for a tape measure.

FIG. 2 shows a tape measure having an abutting portion 5 on its end hook 4 abutting onto the edge of the plate-like object 11 to be measured. Usually, a measuring strip 1 is drawn from a case 10 not being laid on the surface 12 of the object 11 to be measured but apart from the surface 12 at an angular distance shown in FIG. 2. The angular distance between the surface 12 and the measuring strip 1 makes the end hook 4 easily slip off the edge of the object 11 but the end hook 4 does not slip off due to the effect of the rough coat 7 applied to the inside surface 6. However, the method for coating the abutting surface of the end hook 4 with fine crystal particles may easily cause an uneven thickness to the rough layer thereon, resulting in the occurrence of problems concerning the accuracy of the measurement and additional costs concerning corrective treatment.

Figure 3:
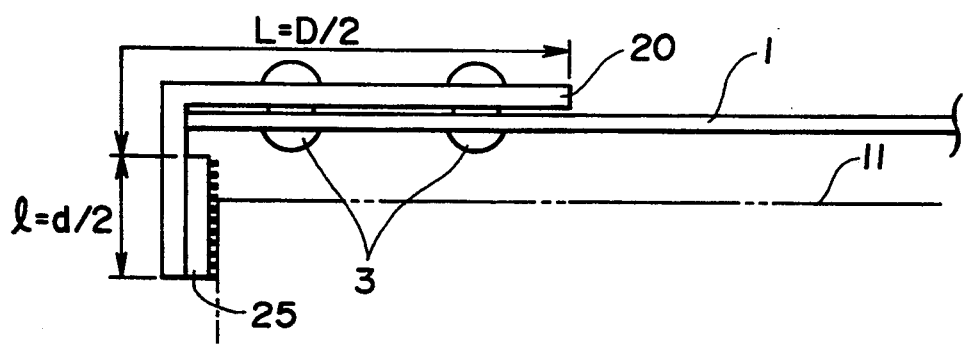
FIG. 3 is a side view of the free end of a measuring tape for a tape measure embodied in the present invention.

FIG. 3 is a side view showing the front end portion of a measuring strip of a tape measure embodied in the present invention. In FIG. 3, there are shown a measuring strip 1, rivets 3, a hook member 20 and a friction plate 25. The measuring strip 1 is a metal tape, e.g. of a carbon tooled steel formed with a convex section which is marked off in units and coated with paint. This metal tape is reeled onto a reel shaft in a case 10. The drawn-out tape can be automatically rewound on the reel by the action of a spring provided on the reel's shaft. The hook member 20 is an L-shaped metal plate (e.g., of stainless steel), which is bent at a right angle and is secured with rivets 3 to the front end of the measuring strip 1. The friction plate 25, made of metal (e.g., of stainless steel), has an unevenly etched surface and attached at its other flat, smooth surface to the rear (inside) surface of the hook 20 by means of an adhesive double-coated tape. It is also possible to firmly secure the friction plate 25 to the hook 20 by a welding means, e.g., spot welding.

Figure 4:
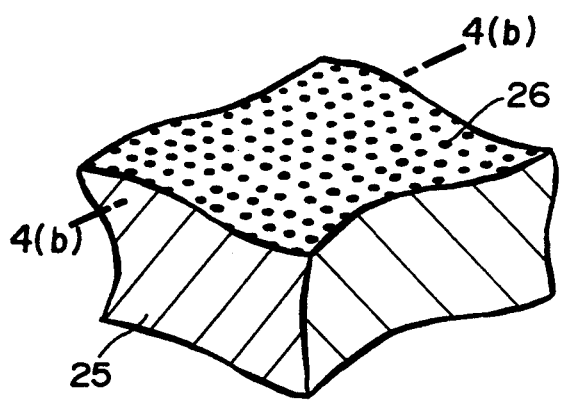
FIGS. 4a–4d are views for explaining an example of a method for manufacturing the end hook of a tape measure according to the present invention.
Figure 4:
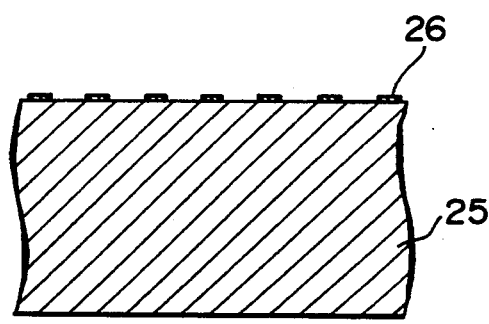
Figure 4:
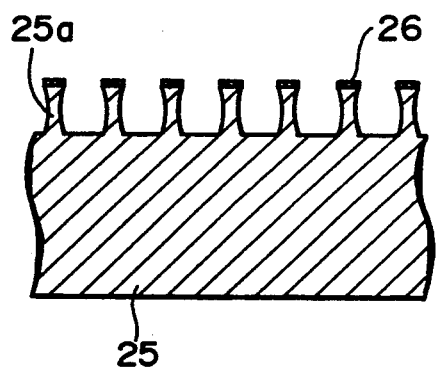
Figure 4:
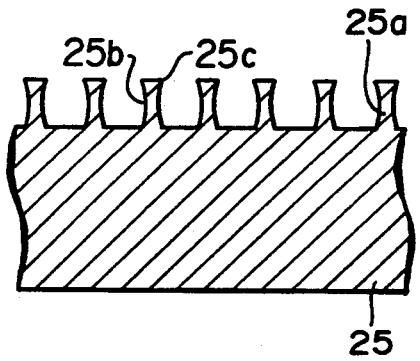

FIGS. 4(a) to 4(d) are views for explaining a process for manufacturing a friction plate. In these drawings, numeral 25 designates a stainless steel plate, numeral 26 designates photoresist and numeral 25a designates convexities. As shown in FIG. 4(a), dots of resist 26 are photolithographically formed on the surface of a stainless steel sheet 25 of an adequate size. FIG. 4(b) is a sectional view, on an enlarged scale, of a portion of the stainless steel sheet 25 having dots of the resist 26 formed on its front surface. The resist may be also formed on the whole rear surface of the stainless steel sheet 25. FIG. 4(c) shows the stainless steel sheet having been subjected to the etching of its surface with an etching solution, e.g., a ferric chloride solution. The surface of the stainless steel sheet is etched to form concavities around the dotted resist portions. Overetching, indicated by the narrower mid-section 25b of the convex portions 25a, is desirable to produce sharp edges at 25c on the convex portions 25a. The resist dots 26 are then removed. The stainless steel sheet 25, having an unevenly etched surface, is now produced as shown in FIG. 4(d). This sheet is cut in order to be a required size and then secured to a hook member 20.

Figure 5:
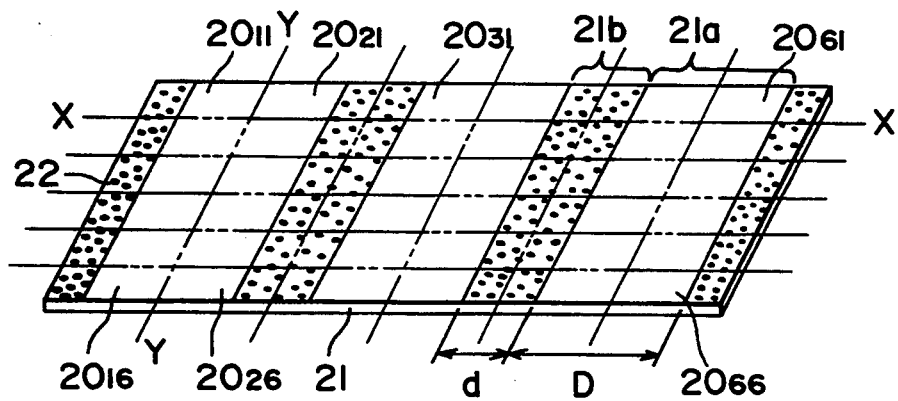
FIG. 5 is a view for explaining another example of a method for manufacturing the end hook of a tape measure according to the present invention.

FIG. 5 is a view for explaining an example of a method for manufacturing a hook member 20. In this case the hook member is composed of a metal plate, e.g., a stainless steel sheet 21 having a surface whereon unevenness is directly and partially formed. In FIG. 5, there are shown hatched portions 21a entirely coated with resist and dotted portions 21b coated with dots of resist 22. The metal sheet is etched and then cut and bent to form the hook member 20. The portion 21a, entirely coated with resist for protection against etching, has its width "D" at twice the required length L of the hook member 20 and the portion 21b, having dots of resist formed thereon for etching to form concavities therebetween, has its width "d" at twice the required length I of the hook member 20. The metal plate may be cut off along the center line of the width of each portion. The portion not to be etched may be coated with resist instead of photoresist.

The above-mentioned metal plate 21 having an unevenly etched surface is cut off along a two-doted chain line in the direction X—X and along a two-doted chain line in the direction Y—Y shown in FIG. 5. By doing so, it is possible to manufacture 36 pieces of hook members $20_{11}$ to $20_{66}$ at a time. However, it will be easily understood that the number of hook members to be simultaneously manufactured is not limited to the embodiment shown and any desirable number of hook members 20 can be produced at the same time. The etched surface may be left as is, but it may be improved in quality by using a nitriding treatment.

As is apparent from the foregoing, the tape measure with a hook member, according to the present invention, offers the advantage that, by unevenly etching the hook member's surface, it may improve the holding capability without causing an uneven thickness of the hook portion which would result in the case of coating with an unlike material. Consequently, the tape measure may easily maintain the required accuracy of measurement and be advantageous from the viewpoint of the manufacturing process and the cost as compared with the prior art.

According to the present invention, the tape measure may be manufactured without any problem in the accuracy of the hook portion since the unevenness of the etched surface of the end hook is composed of micro-area convexities and concavities that do not affect the thickness of the whole plate and may easily hold the object to be measured.

What is claimed is:

1. A tape measure comprising an elongated measuring strip having a free end, an end hook on said free end, said end hook having an abutting surface adaptable to abut an object being measured by the tape measure, said abutting surface comprising a plurality of unetched flat surface areas which are separated from one another by etched depressions in said end hook extending inwardly from said abutting surface, each of said unetched flat surface areas being encircled by said etched depression, each of said unetched flat surface areas being disposed in a common plane which define said abutting surface, whereby accuracy of the tape measure is enhanced in that the position of said unetched flat surface areas is unchanged before and after etching.

2. A tape measure according to claim 1 wherein said hook end has a back surface parallel to said abutting surface, the thickness of said hook end being defined by the distance between said back surface and said abutting surface, said thickness being the same before and after etching.

3. A tape measure according to claim 1 wherein each of said unetched flat surface areas are in the form of a dot.

4. A tape measure according to claim 1 wherein each of said unetched flat surface areas are in the form of a circle.

5. A method of manufacturing an elongated tape measure in which the method of manufacture enhances the accuracy of the elongated tape measure, said elongated tape measure being of the type having an end hook in which the end hook has an initial working surface extending generally perpendicular to the elongated tape measure, comprising:

applying a photoresist to a plurality of spaced areas on said working surface, said spaced areas being separated from one another by an exposed area such that each spaced area is encircled by said exposed area;

etching said exposed area to form a depression in said working surface corresponding to said exposed area such that each spaced area is encircled by said depression;

removing said photoresist from said spaced areas such that said spaced areas define an abutting surface which is part of said initial working surface;

said abutting surface being adaptable to abut against an object being measured by the tape measure, whereby accuracy of the tape measure is enhanced in that said abutting surface defined by said spaced areas is part of said initial working surface.

6. A method according to claim 5 further comprising applying said photoresist as a plurality of dots.

7. A method according to claim 5 further comprising applying said photoresist as a plurality of circles.

8. A tape measure comprising an elongated measuring strip having a free end, an end hook on said free end, said end hook having an abutting surface adaptable to abut an object being measured by the tape measure, said abutting surface comprising a plurality of unetched flat surface areas which are separated from one another by etched depressions in said end hook extending inwardly from said abutting surface, each of said unetched flat surface areas being encircled by said etched depression, each or said unetched flat surface areas being disposed in a common plane which define said abutting surface, whereby accuracy of the tape measure is enhanced in that the position of said unetched flat surface areas is unchanged before and after etching, said end hook having a projection underlying each of said unetched flat surface areas with each projection being surrounded by said etched depression, each of said projections having a top surface defined by said unetched flat surface area, each of said projections having a bottom end joined to said end hook, each of said projections having one diameter at its respective top surface, each of said projections having another diameter intermediate its respective top surface and its respective bottom end, said one diameter being greater than said other diameter, each of said projections having a side wall formed by said depression, said top surface and said side wall intersecting to form a sharp edge of less than 90 degrees.

9. A method of manufacturing an elongated tape measure in which the method of manufacture enhances the accuracy of the elongated tape measure, said elongated tape measure being of the type having an end hook in which the end hook has an initial working surface extending generally perpendicular to the elongated tape measure, comprising:

applying a photoresist to a plurality of spaced areas on said working surface, said spaced areas being separated from one another by an exposed area such that each spaced area is encircled by said exposed area;

etching said exposed area to form a depression in said working surface corresponding to said exposed area such that each spaced area is encircled by said depression;

removing said photoresist from said spaced areas such that said spaced areas define an abutting surface which is part of said initial working surface;

said abutting surface being adaptable to abut against an object being measured by the tape measure, whereby accuracy of the tape measure is enhanced in that said abutting surface defined by said spaced areas is part of said initial working surface;

said etching step comprising overetching such that the depression formed by the etching step at least partially underlies said spaced areas on which the photoresist is disposed to thereby form a sharp edge at the outer periphery of said spaced areas.

* * * * *